(12) United States Patent
Takahashi et al.

(10) Patent No.: US 10,794,160 B2
(45) Date of Patent: Oct. 6, 2020

(54) GEOTHERMAL HEAT RECOVERY DEVICE AND GEOTHERMAL HEAT RECOVERY DEVICE OPERATING METHOD

(71) Applicant: Kobe Steel, Ltd., Kobe-shi (JP)

(72) Inventors: Kazuo Takahashi, Kobe (JP); Shigeto Adachi, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 60 days.

(21) Appl. No.: 15/998,955

(22) PCT Filed: Jan. 25, 2017

(86) PCT No.: PCT/JP2017/002450
§ 371 (c)(1),
(2) Date: Aug. 17, 2018

(87) PCT Pub. No.: WO2017/141645
PCT Pub. Date: Aug. 24, 2017

(65) Prior Publication Data
US 2019/0234190 A1  Aug. 1, 2019

(30) Foreign Application Priority Data

Feb. 19, 2016  (JP) .................................. 2016-030207

(51) Int. Cl.
*E21B 43/12* (2006.01)
*E21B 43/00* (2006.01)
(Continued)

(52) U.S. Cl.
CPC .............. *E21B 43/12* (2013.01); *E21B 43/00* (2013.01); *E21B 43/34* (2013.01); *F01K 1/00* (2013.01);
(Continued)

(58) Field of Classification Search
CPC . E21B 43/12; E21B 43/34; F03G 7/04; F25B 30/06
See application file for complete search history.

(56) References Cited

U.S. PATENT DOCUMENTS 4,388,807 A * 6/1983 Matthews ............... F24T 10/30
60/641.4
6,375,907 B1 * 4/2002 Gallup ...................... C01B 7/01
210/696
(Continued)

FOREIGN PATENT DOCUMENTS

JP    63-177602 U    11/1988
JP    6-147653 A    5/1994
(Continued)

OTHER PUBLICATIONS

JP-06147653-A English Translation (Year: 1994).*
(Continued)

*Primary Examiner* — Shafiq Mian
(74) *Attorney, Agent, or Firm* — Oblon, McClelland, Maier & Neustadt, L.L.P.

(57) ABSTRACT

A geothermal heat recovery device includes a circulation flow path provided with a circulation pump, a heat medium pressurized by the circulation pump circulating through the circulation flow path in a hot liquid state; a heat exchanger installed underground and configured to heat the heat medium flowing through the circulation flow path with underground heat; a binary electricity generation device configured to recover, as electrical energy, thermal energy from the heat medium heated in the heat exchanger; a bypass path connected to the circulation flow path; and an adjustment mechanism configured to adjust a flow division ratio between a flow rate of the heat medium flowing into the heat
(Continued)

exchanger and a flow rate of the heat medium bypassing the heat exchanger through the bypass path.

5 Claims, 12 Drawing Sheets

(51) Int. Cl.
    *F01K 1/00*     (2006.01)
    *E21B 43/34*     (2006.01)
    *F03G 7/04*     (2006.01)
    *F25B 30/06*     (2006.01)

(52) U.S. Cl.
    CPC ................ *F03G 7/04* (2013.01); *F25B 30/06* (2013.01); *Y02E 10/10* (2013.01)

(56) References Cited

U.S. PATENT DOCUMENTS

| | | | | |
|---|---|---|---|---|
| 9,797,272 | B2* | 10/2017 | Adachi | ............. F01K 7/16 60/660 |
| 2011/0126539 | A1* | 6/2011 | Ramaswamy | ......... F01K 25/08 60/641.2 |
| 2013/0333383 | A1 | 12/2013 | Schwarck | |
| 2014/0116046 | A1* | 5/2014 | Hadianto | ................. F03G 7/04 60/641.5 |
| 2015/0337690 | A1* | 11/2015 | Adachi | ................. F01K 13/02 60/660 |

FOREIGN PATENT DOCUMENTS

| | | | |
|---|---|---|---|
| JP | 06147653 A | * | 5/1994 |
| JP | 2013-231377 A | | 11/2013 |
| JP | 2014-84857 A | | 5/2014 |
| JP | 2014-92040 A | | 5/2014 |
| JP | 2014-156843 A | | 8/2014 |
| WO | WO 2013/042398 A1 | | 3/2013 |

OTHER PUBLICATIONS

International Preliminary Report on Patentability and Written Opinion dated Aug. 30, 2018 in PCT/JP2017/002450 (submitting English translation only), citing document AO therein, 10 pages.
International Search Report dated Apr. 4, 2017 in PCT/JP2017/002450 filed Jan. 25, 2017.

* cited by examiner

GEOTHERMAL HEAT RECOVERY DEVICE AND GEOTHERMAL HEAT RECOVERY DEVICE OPERATING METHOD

TECHNICAL FIELD

The present invention relates to a geothermal heat recovery device and a geothermal heat recovery device operating method.

BACKGROUND ART

Conventionally, as disclosed in Patent Literature 1, a geothermal heat recovery device that recovers geothermal heat through a heat exchanger installed underground is known. Specifically, the geothermal heat recovery device disclosed in Patent Literature 1 includes a heat exchanger installed underground and a heat medium flow path which is connected to the heat exchanger and through which the heat medium circulates. The heat medium flow path is provided with a turbine driven by the heat medium vaporized by the heat exchanger, a cooling system that condenses the heat medium that has driven the turbine, and a pump that pressurizes the liquid heat medium. An electricity generator is connected to the turbine. The electricity generator generates electricity by the turbine being driven by the gaseous heat medium.

In Patent Literature 1, the turbine is driven by the gaseous heat medium. That is, thermal energy of the gaseous heat medium is recovered as electrical energy. For this reason, an amount of electricity generation is limited.

CITATION LIST

Patent Literature

Patent Literature 1: Japanese Translation of PCT Publication 2014-500420

SUMMARY OF INVENTION

An object of the present invention is to increase the amount of electricity generation in an electricity generation system utilizing geothermal heat energy.

A geothermal heat recovery device according to one aspect of the present invention includes: a circulation flow path provided with a circulation pump, a heat medium pressurized by the circulation pump circulating through the circulation flow path in a hot liquid state; a heat exchanger installed underground and configured to heat the heat medium flowing through the circulation flow path with underground heat; and a binary electricity generation device configured to recover, as electrical energy, thermal energy from the heat medium heated by the heat exchanger.

A method for operating a geothermal heat recovery device according to another aspect of the present invention is a method for operating a geothermal heat recovery device including a heat exchanger installed underground and configured to heat a heat medium flowing through a circulation flow path with underground heat, the method including performing a start-up operation to gradually increase a flow rate of the heat medium flowing into the heat exchanger while monitoring pressure and temperature on an exit side of the heat exchanger.

DESCRIPTION OF EMBODIMENTS

Embodiments for carrying out the present invention will be described in detail below with reference to the drawings.

Figure 1:
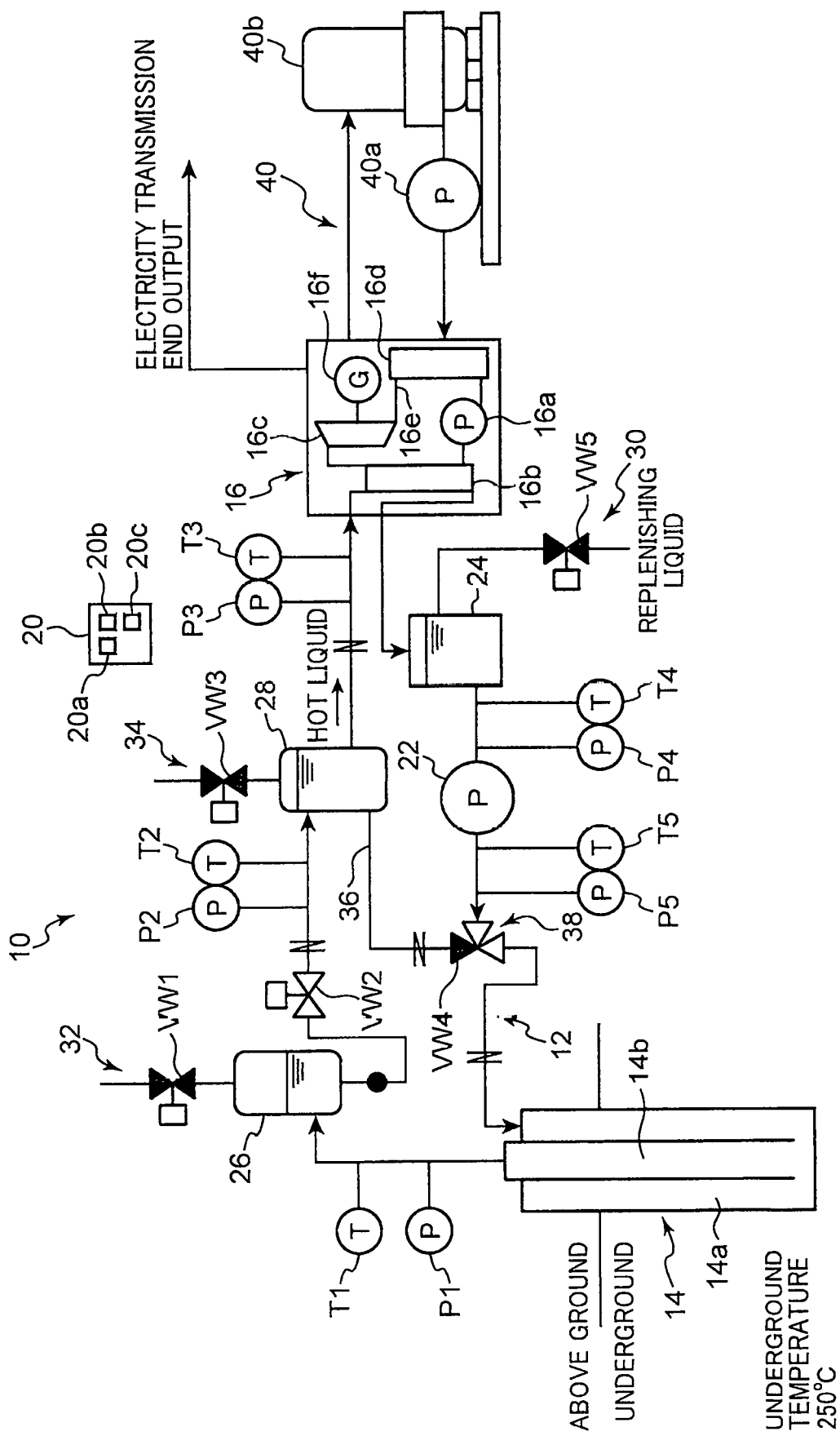
FIG. 1 is a diagram schematically illustrating an overall configuration of a geothermal heat recovery device according to an embodiment of the present invention.

As illustrated in FIG. 1, a geothermal heat recovery device 10 according to the present embodiment is a device that recovers geothermal energy as electrical energy, and includes a circulation flow path 12 through which a heat medium circulates, a heat exchanger 14 installed underground, a binary electricity generation device 16, and a controller 20. Water is used as the heat medium, but the heat medium is not limited to water.

The circulation flow path 12 is a flow path that forms a closed loop by connecting the heat exchanger 14 and the binary electricity generation device 16 thereto, and the heat medium is sealed therein. In the circulation flow path 12, a circulation pump 22, a buffer tank 24, a flash tank 26, and a mixing tank 28 are provided.

The circulation pump 22 causes the liquid heat medium to circulate in the circulation flow path 12, and can pressurize the heat medium such that the heat medium is maintained in a hot liquid state. The heat medium pumped out from the circulation pump 22 flows toward the heat exchanger 14.

The buffer tank 24 is provided on an upstream side of the circulation pump 22. One end of a portion connecting the buffer tank 24 and the circulation pump 22 in the circulation flow path 12 is connected to the buffer tank 24 at a bottom of the buffer tank 24. Therefore, a pressure head of the liquid heat medium stored in the buffer tank 24 is applied to a suction port of the heat medium in the circulation pump 22. This can prevent cavitation when the heat medium is sucked into the circulation pump 22.

The buffer tank 24 stores the heat medium. The buffer tank 24 is provided with a replenisher 30 that replenishes the circulation flow path 12 with the heat medium. The replenisher 30 is configured to supply the heat medium to the buffer tank 24 by opening an on-off valve VW5. The replenisher 30 may be configured to open and close the on-off valve VW5 manually, or may be configured to open and close the on-off valve VW5 according to a detected value of a fourth pressure detector P4 described later.

The flash tank 26 is disposed on a downstream side of the heat exchanger 14 in the circulation flow path 12. The flash tank 26 flashes the heat medium heated in the heat exchanger 14, and can separate the heat medium into a liquid heat medium and a gaseous heat medium. The heat medium in a hot liquid state is stored during a normal operation in a lower portion of the flash tank 26. The liquid heat medium in the flash tank 26 is led out from the bottom to the circulation flow path 12.

The flash tank 26 is provided with a discharge mechanism 32. The discharge mechanism 32 is provided on the top of the flash tank 26. An on-off valve VW1 can switch the discharge mechanism 32 between an open state and a closed state. Setting the discharge mechanism 32 in an open state allows the gaseous heat medium in the flash tank 26 to be discharged externally.

The mixing tank 28 is disposed between the flash tank 26 and the binary electricity generation device 16 in the circulation flow path 12. An opening and closing mechanism VW2 is provided between the flash tank 26 and the mixing tank 28 in the circulation flow path 12. The mixing tank 28 is provided with a gas-draining mechanism 34 including an on-off valve VW3.

A bypass path 36 is connected to the circulation flow path 12. A first end (inflow end) of the bypass path 36 is connected to a portion between the circulation pump 22 and the heat exchanger 14 in the circulation flow path 12. The bypass path 36 causes the heat medium discharged from the circulation pump 22 to bypass the heat exchanger 14 and to join a portion of circulation flow path 12 at the downstream side of the flash tank 26.

A second end (outflow end) of the bypass path 36 is directly connected to the mixing tank 28, but this is not restrictive. The second end of the bypass path 36 may be connected to the circulation flow path 12 on an upstream side of the mixing tank 28 and on a downstream side of the heat exchanger 14.

A three-way valve VW4 serving as an adjustment mechanism 38 for adjusting a flow division ratio of the heat medium is provided at the inflow end of the bypass path 36. The three-way valve VW4 is configured to allow adjustment of a ratio between a flow rate of the heat medium discharged from the circulation pump 22 and flowing into the heat exchanger 14, and a flow rate of the heat medium bypassing the heat exchanger 14.

The heat exchanger 14 is a double-pipe-type heat exchanger and includes an outer pipe 14a and an inner pipe 14b disposed inside the outer pipe 14a. A first side (lower side) end and a second side (upper side) end of the outer pipe 14a are closed. A first side (lower side) end of the inner pipe 14b is open in the outer pipe 14a, whereas a second side (upper side) end is closed. Therefore, inner space of the inner pipe 14b communicates with inner space of the outer pipe 14a (that is, outer space of the inner pipe 14b) through the lower end of the inner pipe 14b.

An inlet through which the heat medium is introduced from the circulation flow path 12 is formed at the upper end of the outer pipe 14a. An outlet for leading out the heat medium from the inner space of the inner pipe 14b to the circulation flow path 12 is formed at the upper end of the inner pipe 14b. A peripheral surface of the outer pipe 14a functions as a heat transfer surface for receiving geothermal heat. Therefore, in the heat exchanger 14, the heat medium flowing in the outer pipe 14a receives geothermal heat and is heated. The heat medium heated in the outer pipe 14a flows into the inner pipe 14b and then is led out to the circulation flow path 12. The geothermal heat may be, for example, at about 250° C., and may be at a higher temperature. Note that the heat exchanger 14 may be completely buried underground, and an upper portion may protrude above the ground.

The binary electricity generation device 16 includes a working medium circulation circuit 16e provided with a working pump 16a, an evaporator 16b, an expander 16c, and a condenser 16d. The working pump 16a drives the working medium to circulate through the circulation circuit 16e. The working medium is a low-boiling point refrigerant such as R245fa. The working pump 16a includes a pump with an adjustable number of revolutions.

The evaporator 16b is configured to heat the working medium with the heat medium and cause the working medium to evaporate. The expander 16c expands the gaseous working medium obtained in the evaporator 16b. An electricity generator 16f is connected to the expander 16c. The operation of the expander 16c causes the electricity generator 16f to generate electricity. The condenser 16d cools the working medium expanded by the expander 16c with a cooling medium (cooling water or the like) flowing through a cooling circuit 40 by driving the pump 40a. The gaseous working medium condenses in the condenser 16d. The cooling circuit 40 is connected to a cooler 40b.

The geothermal heat recovery device 10 includes temperature detectors T1 to T5 and pressure detectors P1 to P5. The temperature detectors T1 to T5 detect temperatures of the heat medium and output signals indicative of the detected temperatures. The pressure detectors P1 to P5 detect pressures of the heat medium and output signals indicative of the detected pressures.

The temperature detectors T1 to T5 include the first temperature detector T1 disposed in a flow path between the heat exchanger 14 and the flash tank 26 in the circulation flow path 12, the second temperature detector T2 disposed in a flow path between the flash tank 26 and the mixing tank 28 in the circulation flow path 12, the third temperature detector T3 disposed in a flow path between the mixing tank 28 and the binary electricity generation device 16 in the circulation flow path 12, the fourth temperature detector T4 disposed in a flow path between the buffer tank 24 and the circulation pump 22 in the circulation flow path 12, and the fifth temperature detector T5 disposed in a flow path between the circulation pump 22 and the adjustment mechanism 38 in the circulation flow path 12.

The pressure detectors P1 to P5 include the first pressure detector P1 disposed in a flow path between the heat exchanger 14 and the flash tank 26 in the circulation flow path 12, the second pressure detector P2 disposed in a flow path between the flash tank 26 and the mixing tank 28 in the circulation flow path 12, the third pressure detector P3 disposed in a flow path between the mixing tank 28 and the binary electricity generation device 16 in the circulation flow path 12, the fourth pressure detector P4 disposed in a flow path between the buffer tank 24 and the circulation pump 22 in the circulation flow path 12, and the fifth pressure detector P5 disposed in a flow path between the circulation pump 22 and the adjustment mechanism 38 in the circulation flow path 12.

The first temperature detector T1 and the first pressure detector P1 detect the temperature or pressure of the heat medium on an exit side of the heat exchanger 14. The second temperature detector T2 and the second pressure detector P2 detect the temperature or pressure of the liquid heat medium flowing out from the flash tank 26. The third temperature detector T3 and the third pressure detector P3 detect the temperature or pressure of the heat medium introduced into the binary electricity generation device 16. The fourth temperature detector T4 and the fourth pressure detector P4 detect the temperature or pressure of the heat medium on a suction side of the circulation pump 22. The fifth temperature detector T5 and the fifth pressure detector P5 detect the temperature or pressure of the heat medium on a discharge side of the pump.

The controller 20 is configured to receive the signals output from the first to fifth temperature detectors T1 to T5 and the first to fifth pressure detectors P1 to P5. The controller 20 includes a storage unit, an arithmetic unit, and the like, and executes a control program stored in the storage unit, thereby exerting a predetermined function. This function includes at least a start-up operation control unit 20a, a normal operation control unit 20b, and a stop control unit 20c.

The start-up operation control unit 20a controls the operation to be performed when activating the geothermal heat recovery device 10. The start-up operation control unit 20a performs control to perform a first preliminary operation, a second preliminary operation, and a third preliminary operation in this order until the activation of the binary electricity generation device 16.

In the first preliminary operation, while driving the circulation pump 22, the start-up operation control unit 20a closes an on-off valve VW2 and closes a heat exchanger-side port in the three-way valve VW4. Therefore, through the bypass path 36, the heat medium circulates in the circulation flow path 12 so as to bypass the heat exchanger 14. Also, in the first preliminary operation, the on-off valve VW3 of the gas-draining mechanism 34 is opened to drain gas. Also, in the first preliminary operation, the pump 40a of the cooling circuit 40 is driven, and the cooling medium flows through the cooling circuit 40.

The first preliminary operation is performed for a predetermined time, and when a preset time has elapsed, the operation shifts to the second preliminary operation. In the second preliminary operation, the start-up operation control unit 20a opens the on-off valve VW1 of the discharge mechanism 32 and slightly opens the heat exchanger-side port of the three-way valve VW4. Accordingly, a small amount of the heat medium is introduced into the heat exchanger 14. The gaseous heat medium vaporized in the heat exchanger 14 is discharged externally from the discharge mechanism 32 provided in the flash tank 26. In the second preliminary operation, when a predetermined condition is satisfied, the operation shifts to the third preliminary operation.

In the third preliminary operation, the start-up operation control unit 20a causes the heat medium in the circulation flow path 12 to circulate with the opening and closing mechanism VW2 opened. The third preliminary operation is performed until the heat medium supplied to the binary electricity generation device 16 reaches a preset temperature. When the heat medium reaches the preset temperature, the start-up operation control unit 20a ends the start-up operation and switches to the normal operation.

On the basis that a detected value of the third temperature detector T3 has reached the preset temperature, the normal operation control unit 20b activates the binary electricity generation device 16. That is, the normal operation control unit 20b activates the working pump 16a of the binary electricity generation device 16. Accordingly, the working medium circulates in the circulation circuit 16e, and the normal operation is performed in which electricity is generated.

The stop control unit 20c executes control for emergency stop of the geothermal heat recovery device 10. Specifically, upon receipt of a command for emergency stop of the geothermal heat recovery device 10 (emergency cutoff signal), the stop control unit 20c fully opens the discharge mechanism 32, closes the heat exchanger-side port of the three-way valve VW4, and closes the opening and closing mechanism VW2. This will prevent the heat medium discharged from the circulation pump 22 from flowing toward the heat exchanger 14. Meanwhile, the amount of the heat medium flowing into the heat exchanger 14 is reduced and the heat medium is rapidly vaporized in the heat exchanger 14. Therefore, by closing the opening and closing mechanism VW2 and fully opening the on-off valve VW1 of the discharge mechanism 32, the vaporized gas is discharged externally.

Here, the start-up operation of the geothermal heat recovery device 10 according to the present embodiment will be described with reference to FIGS. 2 to 6. Note that in FIGS. 3 to 6, in the three-way valve VW4, a closed port is drawn in black, whereas an open port is drawn in white. Regarding the on-off valves VW1, VW3, VW5 and the opening and closing mechanism VW2, a closed state is drawn in black, whereas an open state is drawn in white.

Figure 2:
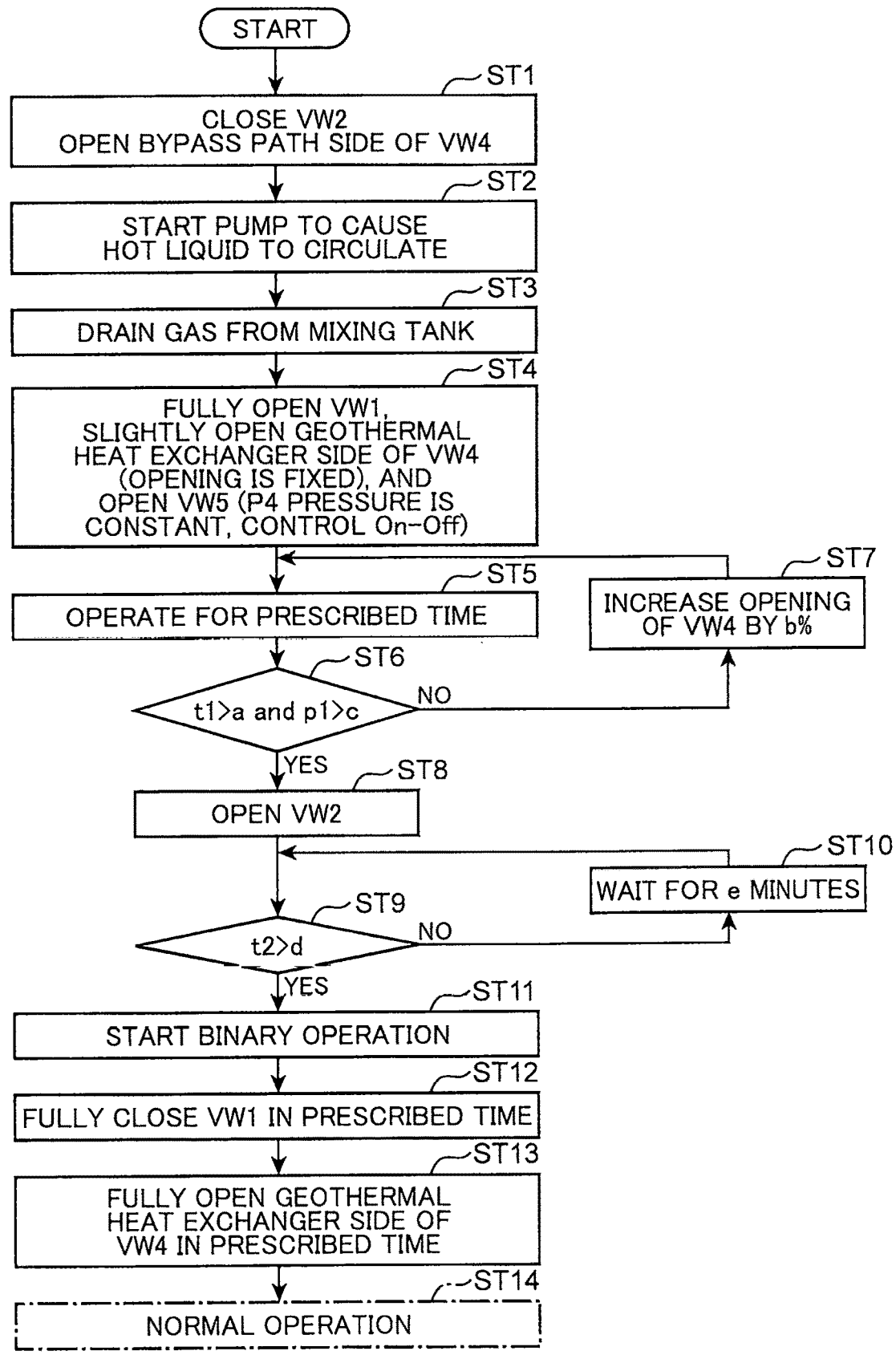
FIG. 2 is a flowchart illustrating an operation in a start-up operation of the geothermal heat recovery device.
Figure 3:
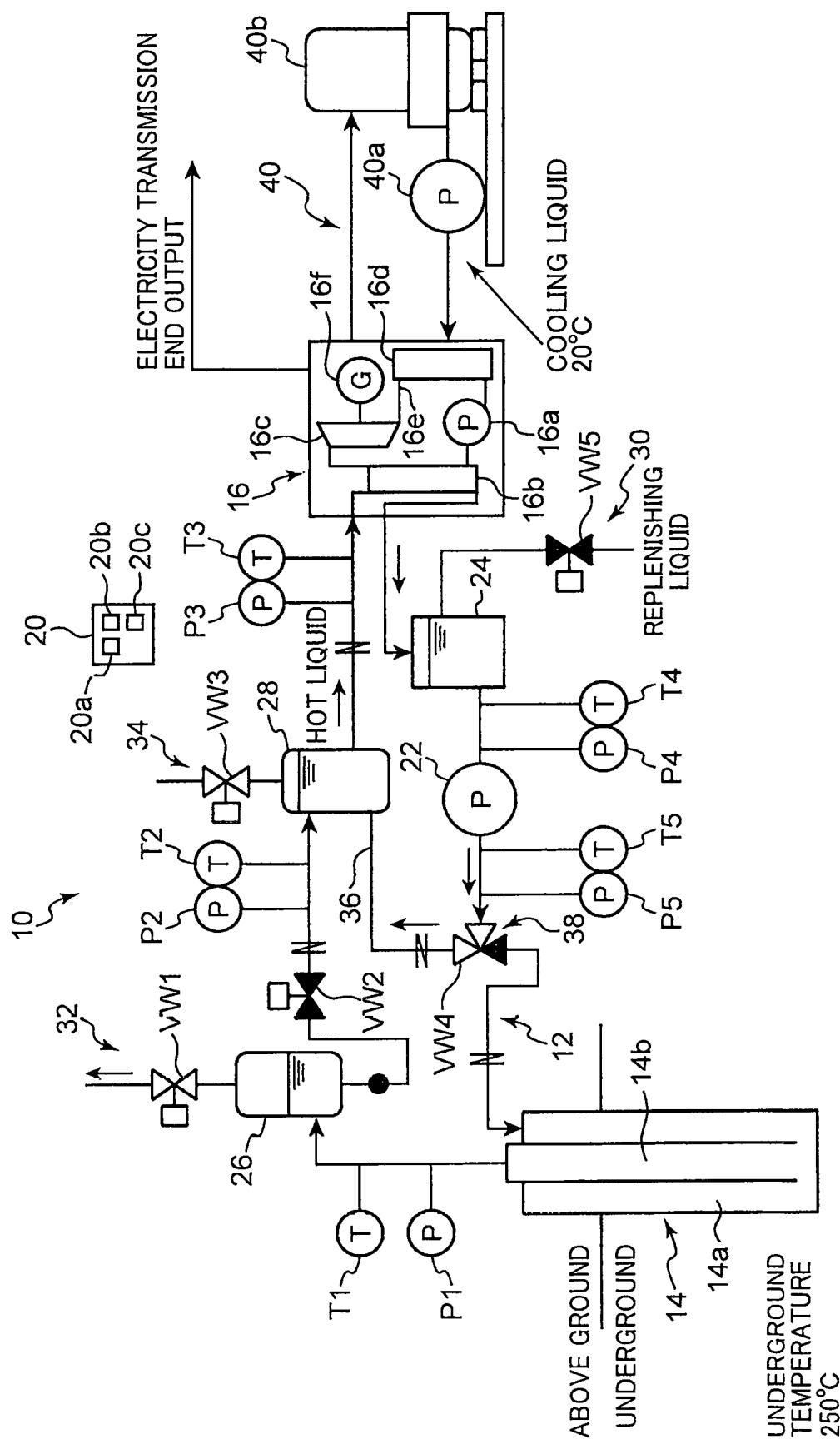
FIG. 3 is a diagram for describing the geothermal heat recovery device in a first preliminary operation.
Figure 4:
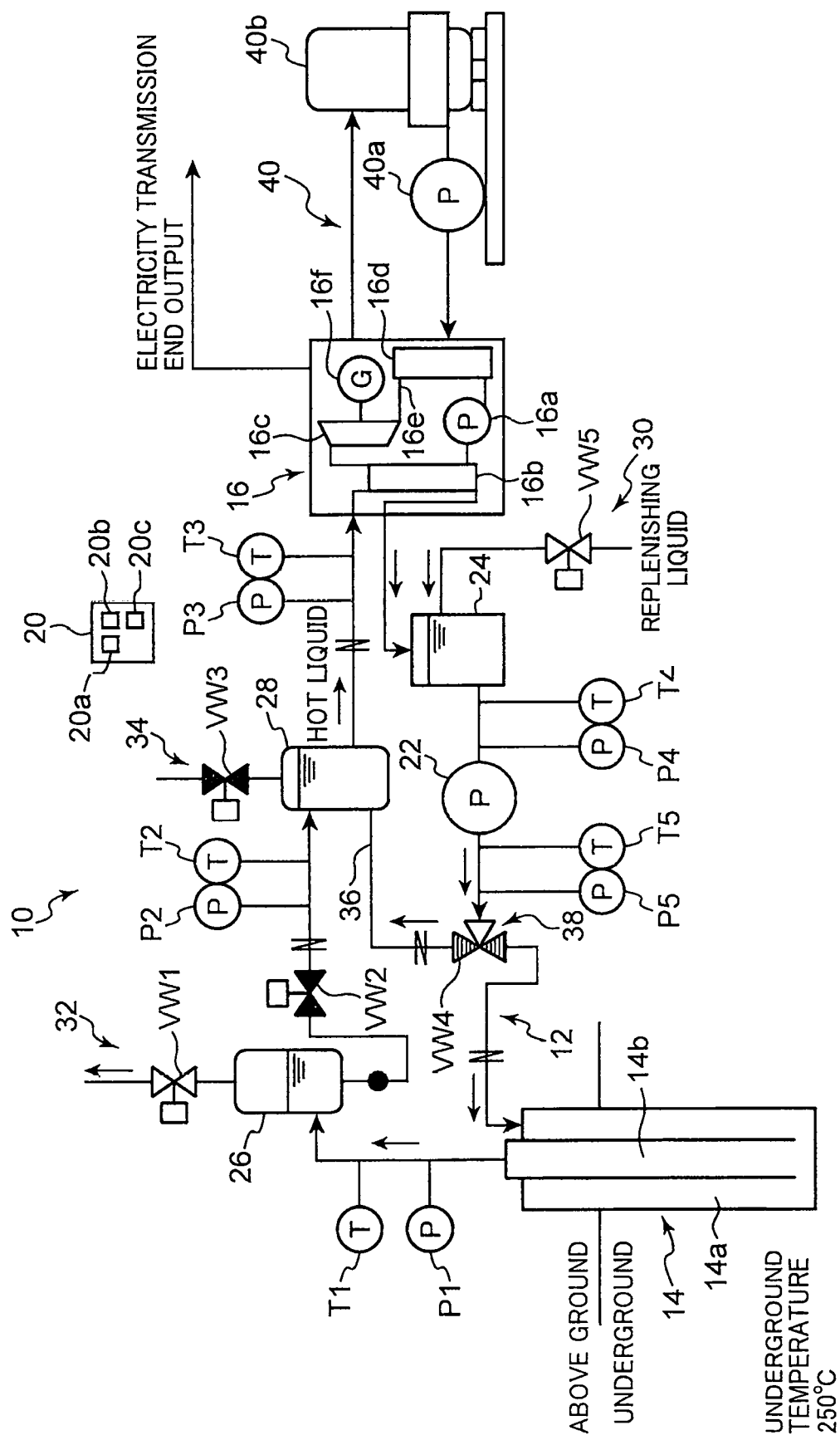
FIG. 4 is a diagram for describing the geothermal heat recovery device in a second preliminary operation.

In the start-up operation, the start-up operation control unit 20a first performs the first preliminary operation. As illustrated in FIGS. 2 and 3, in the first preliminary operation, the on-off valve VW2 is closed, and a bypass path-side port communicates with a pump-side port in the three-way valve VW4 (step ST1). Accordingly, the heat exchanger-side port of the three-way valve VW4 is closed. Then, when the start-up operation control unit 20a activates the circulation pump 22 (step ST2), the heat medium delivered from the circulation pump 22 is introduced into the mixing tank 28 through the bypass path without going through the heat exchanger 14 and the flash tank 26. Note that, although pressurized, the heat medium at this time is not in a hot liquid state because the heat medium flows through the circulation flow path 12 without being heated in the heat exchanger 14.

In the first preliminary operation, the on-off valve VW3 of the gas-draining mechanism 34 provided in the mixing tank 28 is open to drain gas from the mixing tank 28 (step ST3). Therefore, gas in the mixing tank 28 is drained while the heat medium is circulated in the circulation flow path 12 via the bypass path 36. Also, in the first preliminary operation, the pump 40a of the cooling circuit 40 is driven, and the cooling medium flows through the cooling circuit 40. Note that the pump of the binary electricity generation device 16 has not been activated yet.

The first preliminary operation is performed for a predetermined time and when the preset time elapses, the start-up operation control unit 20a performs the second preliminary operation. In the second preliminary operation, while the on-off valve VW3 of the gas-draining mechanism 34 is closed, the on-off valve VW1 of the discharge mechanism 32 is fully opened, and the heat exchanger-side port in the three-way valve VW4 is slightly opened (step ST4). That is, in the three-way valve VW4, the pump-side port communicates with the bypass path-side port and the heat exchanger-side port. This will cause a small amount of the heat medium to be introduced into the heat exchanger 14. At this time, although the heat medium is rapidly vaporized in the heat exchanger 14, since the amount of the heat medium introduced into the heat exchanger 14 is still small, the pressure inside the pipe does not rise rapidly on the exit side of the heat exchanger 14. Then, the gaseous heat medium vaporized in the heat exchanger 14 is discharged externally from the discharge mechanism 32 provided in the flash tank 26.

At this time, the start-up operation control unit 20a opens and closes the on-off valve VW5 of the replenisher 30 according to the detected value of the fourth pressure detector P4. Accordingly, an amount of the heat medium corresponding to the amount discharged from the flash tank 26 is replenished, and the amount of the heat medium stored in the buffer tank 24 is stabilized.

In the second preliminary operation, the start-up operation control unit 20a performs control to gradually increase the opening of the heat exchanger-side port at predetermined time intervals. That is, after performing control to maintain the opening of the heat exchanger-side port for a predetermined time (step ST5), when the predetermined time elapses, the start-up operation control unit 20a determines whether to increase the opening of the heat exchanger-side port based on detected values t1 and p1 of the first temperature detector T1 and the first pressure detector P1 provided on the exit side of the heat exchanger 14 (step ST6). Specifically, in the second preliminary operation, the start-up operation control unit 20a monitors the detected values t1 and p1 of the first temperature detector T1 and the first pressure detector P1, and determines whether the detected value t1 of the first temperature detector T1 is greater than a threshold a and the detected value p1 of the first pressure detector P1 is greater than a threshold c. When this condition is not satisfied, the start-up operation control unit 20a increases the opening of the heat exchanger-side port in the three-way valve VW4 by a preset opening (b %) (step ST7). After increasing the opening of the heat exchanger-side port, the start-up operation control unit 20a returns to step ST5 again and maintains the opening for the predetermined time. Here, the start-up operation control unit 20a waits for the predetermined time in order to detect the temperature and pressure on the exit side of the heat exchanger 14 that has risen due to an increase in the flow rate of the heat medium introduced into the heat exchanger 14, because the temperature and pressure on the exit side of the heat exchanger 14 will not rise soon even if the flow rate of the heat medium introduced into the heat exchanger 14 is increased. Thus, waiting for the predetermined time and increasing the opening of the heat exchanger-side port by a predetermined opening are repeated to gradually increase the amount of the heat medium introduced into the heat exchanger 14. This makes it possible to prevent the pressure on the exit side of the heat exchanger 14 from rising rapidly.

Figure 5:
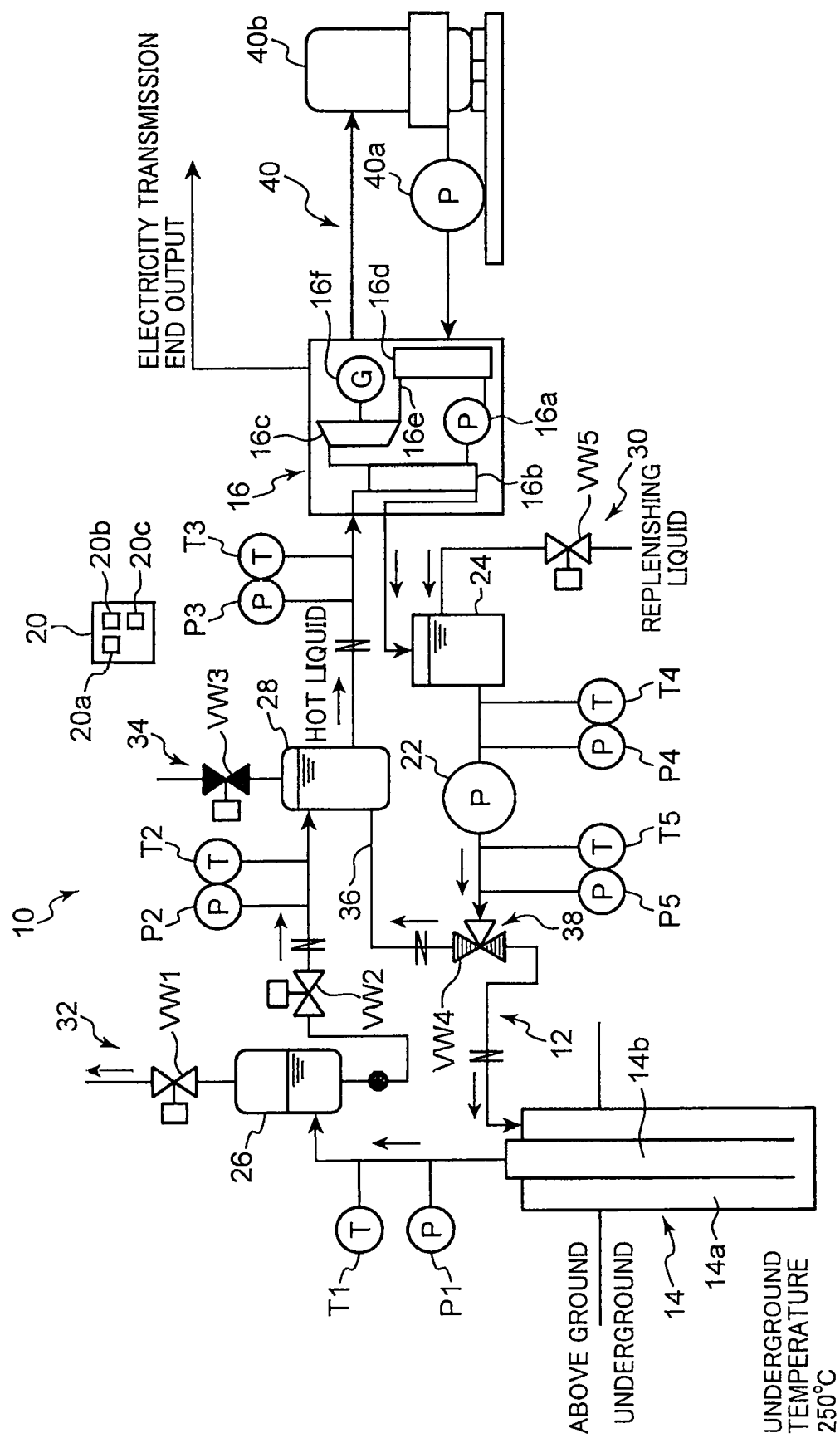
FIG. 5 is a diagram for describing the geothermal heat recovery device in a third preliminary operation.

Then, when a condition is satisfied that the heat medium on the exit side of the heat exchanger 14 is at a temperature higher than a preset specified temperature a and is at a pressure higher than a preset specified pressure c (YES in step ST6), as also illustrated in FIG. 5, the start-up operation control unit 20a shifts to the third preliminary operation and opens the opening and closing mechanism VW2 (step ST8). This condition is for determining whether the heat medium on the exit side of the heat exchanger 14 is in a hot liquid state. Then, when the opening and closing mechanism VW2 is opened, the heat medium heated in the heat exchanger 14 is also introduced into the mixing tank 28. That is, as the flow rate of the heat medium introduced into the heat exchanger 14 increases, the amount of the heat medium led out from the heat exchanger 14 in a gaseous state gradually decreases, and the amount of the heat medium led out from the heat exchanger 14 in a liquid state gradually increases. Then, the heat medium in a supercooled state (in a pressurized state, in a liquid state having a temperature lower than a saturation temperature, that is, in a hot liquid state) flows out from the heat exchanger 14. This supercooled heat medium is introduced into the mixing tank 28. Note that, at the beginning of the third preliminary operation as well, the on-off valve VW1 of the discharge mechanism 32 is maintained in a fully open state.

Figure 6:
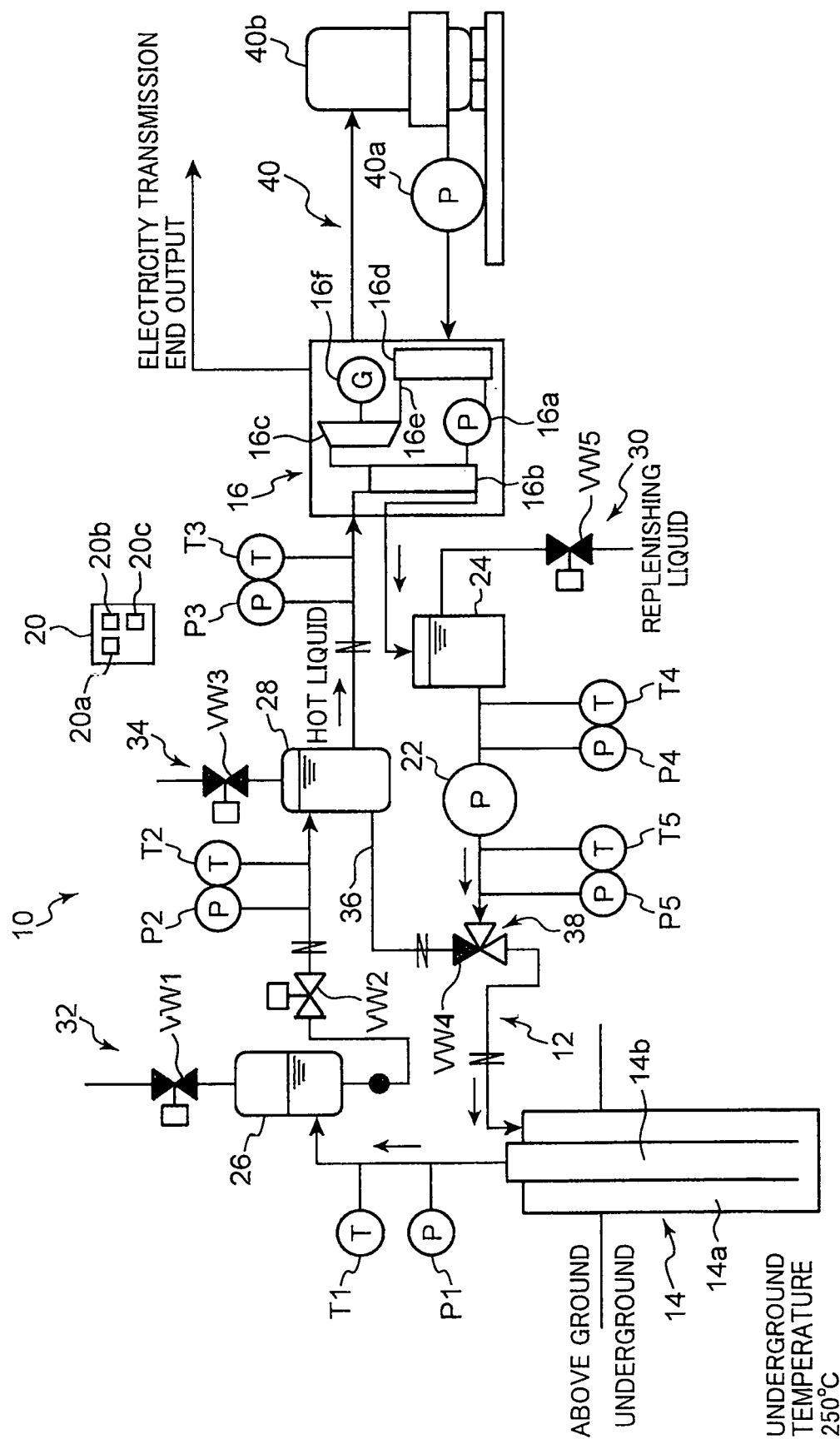
FIG. 6 is a diagram for describing the geothermal heat recovery device in a normal Operation.

Subsequently, the start-up operation control unit 20a determines whether a detected value t2 by the second temperature detector T2 has become higher than a preset temperature d (step ST9). When the detected value t2 is equal to or less than the temperature d, the start-up operation control unit 20a waits for a predetermined time (e minutes) (step ST10), and again determines whether the detected value t2 has become higher than the temperature d. Then, when the detected value t2 becomes higher than the temperature d, the start-up operation control unit 20a activates the binary electricity generation device 16 (step ST11). At this time, the start-up operation control unit 20a fully closes the on-off valve VW1 of the discharge mechanism 32 in a prescribed time (step ST12). Then, as illustrated in FIG. 6, the three-way valve VW4 fully closes the bypass path-side port and causes the pump-side port to communicate with the heat exchanger-side port (step ST13). Accordingly, the normal operation control unit 20b starts the normal operation. As a result, the geothermal heat recovery device 10 shifts to the normal operation (step ST14), and the pressurized heat medium discharged from the circulation pump 22 is introduced into the heat exchanger 14 without flowing through the bypass path 36 and is heated in the heat exchanger 14. The heat medium flowing out from the heat exchanger 14 is in a hot liquid state and is introduced into the flash tank 26. The heat medium in a hot liquid state within the flash tank 26 is introduced into the evaporator 16b of the binary electricity generation device 16 via the mixing tank 28. In the binary electricity generation device 16, the working medium is evaporated by the heat medium in the evaporator 16b, and the evaporated working medium drives the expander 16c. Electricity is generated in the electricity generator driven by the expander 16c. That is, thermal energy of the heat medium is recovered as electrical energy. The working medium that drove the expander 16c is condensed by the cooling water in the condenser 16d and is sent to the evaporator 16b by the working pump 16a. Such an operation is performed in the binary electricity generation device 16. Note that at the beginning of the start-up operation, the heat medium stored in the flash tank 26 is in a saturated liquid state, but during the normal operation, the heat medium in a hot liquid state is introduced into the flash tank 26. Therefore, during the normal operation, the heat medium in a hot liquid state is stored in the flash tank 26.

Since the geothermal temperature is almost stable, after shifting to the normal operation, the temperature of the heat medium introduced into the evaporator 16b of the binary electricity generation device 16 is almost stable. However, in the normal operation, the third temperature detector T3 may monitor the temperature of the heat medium introduced into the evaporator 16b of the binary electricity generation device 16, and the opening of the bypass path-side port in the three-way valve VW4 may be adjusted according to the detected value of the third temperature detector T3.

Figure 7:
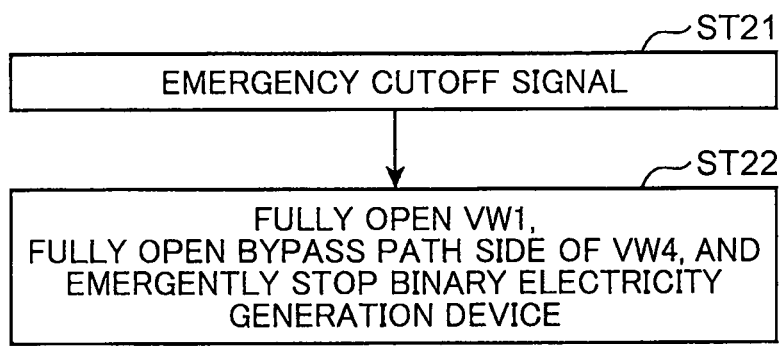
FIG. 7 is a flowchart illustrating an operation at the time of emergency stop of the geothermal heat recovery device.
Figure 8:
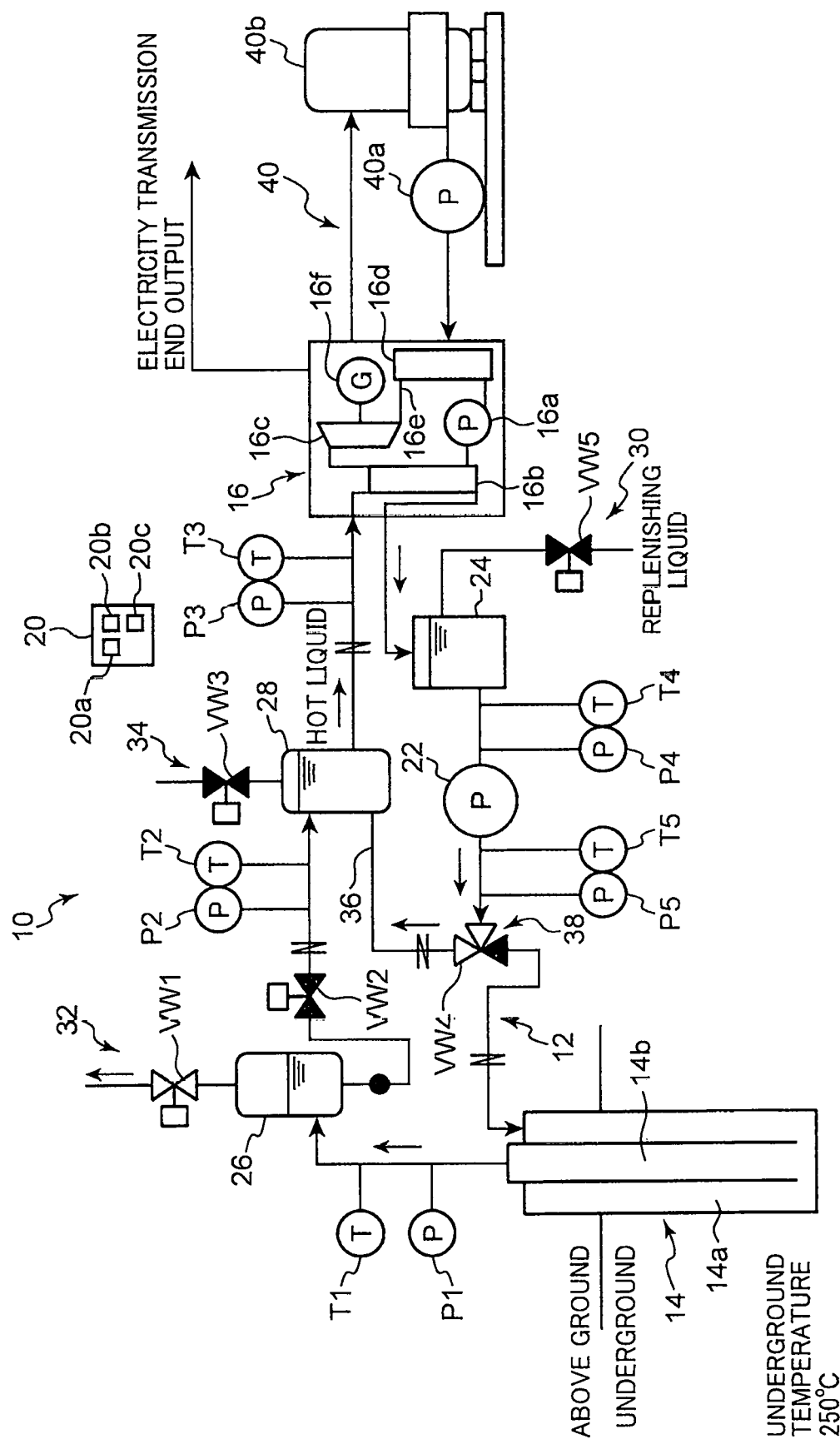
FIG. 8 is a diagram for describing an operation state at the time of emergency stop of the geothermal heat recovery device.

Next, the operation of the geothermal heat recovery device 10 at the time of emergency stop will be described with reference to FIGS. 7 and 8. At the time of emergency stop, that is, when the controller 20 receives a command for emergency stop of the geothermal heat recovery device 10 (emergency cutoff signal) (step ST21), the stop control unit 20*c* fully opens the on-off valve VW1 of the discharge mechanism 32 and causes the bypass path-side port to communicate with the pump-side port of the three-way valve VW4 (step ST22). Accordingly, the heat exchanger-side port of the three-way valve VW4 is closed. Therefore, the heat medium discharged from the circulation pump 22 flows through the bypass path 36 without being introduced into the heat exchanger 14, and is introduced into the mixing tank 28. Since the on-off valve VW1 of the discharge mechanism 32 is fully opened, the gaseous heat medium vaporized in the heat exchanger 14 is discharged externally from the discharge mechanism 32. This makes it possible to suppress high pressure of the heat exchanger 14 and piping on the exit side thereof. Note that the binary electricity generation device 16 is stopped emergently.

As described above, in the present embodiment, the heat medium heated by the heat exchanger 14 flows through the circulation flow path 12 in a hot liquid state, and thermal energy of the heat medium is recovered as electrical energy by the binary electricity generation device 16. Therefore, it is possible to make the amount of heat input from the heat medium larger than in a case of driving the turbine with the gaseous heat medium to recover electrical energy, and to increase the amount of electricity generation. In addition, since the heat medium is prevented from boiling, heat of the heat medium can be efficiently transferred to the binary electricity generation device 16. In addition, since the heat medium is prevented from boiling and is maintained in a hot liquid state, not only it is possible to ensure sufficient electricity generation but also it is unnecessary to take measures to cope with a rise of pressure inside the pipe in the heat exchanger or the like.

In the present embodiment, there is provided the adjustment mechanism 38 for adjusting the flow division ratio between the flow rate of the heat medium flowing into the heat exchanger 14 and the flow rate of the heat medium bypassing the heat exchanger 14. Therefore, in a case where the heat medium is rapidly heated in the heat exchanger 14, such as when the heat medium starts to flow into the heat exchanger 14 at the start-up operation or the like, the flow rate of the heat medium flowing into the heat exchanger 14 can be reduced. This makes it possible to prevent a large amount of steam from being generated in the heat exchanger 14. In addition, the temperature of the heat medium flowing toward the binary electricity generation device 16 can be adjusted by adjusting the flow division ratio of the heat medium by the adjustment mechanism 38.

In the present embodiment, even if part of the heat medium in the heat exchanger 14 is vaporized to be in a gas-liquid two-phase state, this can be separated into the liquid heat medium and the gaseous heat medium in the flash tank 26. This makes it possible to prevent the gaseous heat medium from being introduced into the binary electricity generation device 16. For example, at the beginning of the start-up operation, when a small amount of heat medium is introduced into the heat exchanger 14, the vaporized heat medium flows out of the heat exchanger 14. In this case, at least part of the heat medium can be liquefied by flashing the vaporized heat medium in the flash tank 26.

In the present embodiment, the discharge mechanism 32 and the replenisher 30 are provided, and it is possible to replenish the reduced amount of heat medium while exhausting the gaseous heat medium. This makes it possible to prevent the amount of the heat medium from gradually decreasing. Moreover, it is unnecessary to provide means for liquefying the gaseous heat medium.

In the present embodiment, the heat medium heated in the heat exchanger 14 and the heat medium bypassing the heat exchanger 14 are mixed in the mixing tank 28. Therefore, the temperature of the heat medium in the mixing tank 28 can be adjusted by adjusting the flow division ratio of the heat medium by the adjustment mechanism 38. As a result, the temperature of the heat medium flowing toward the binary electricity generation device 16 can be adjusted.

In the present embodiment, at the time of starting to activate the geothermal heat recovery device 10, since the flow rate of the heat medium flowing into the heat exchanger 14 is gradually increased, it is possible to prevent generation of a large amount of steam in the heat exchanger 14. Also, since it is possible to prevent occurrence of a rapid temperature change and pressure change, it is possible to prevent the heat exchanger 14 and piping on the exit side thereof from being damaged.

When the circulation pump 22 is stopped, a rapid decrease in the flow rate of the circulation flow path 12 may cause the heat medium to be rapidly gasified in the heat exchanger 14. In the present embodiment, by fully opening the discharge mechanism 32, it is possible to discharge the gasified heat medium externally. This makes it possible to prevent the heat exchanger 14 and piping on the exit side thereof from being damaged. Since the heat medium is prevented from flowing from the flash tank 26 to the binary electricity generation device 16, it is possible to prevent the gaseous heat medium from being introduced into the binary electricity generation device 16.

Figure 9:
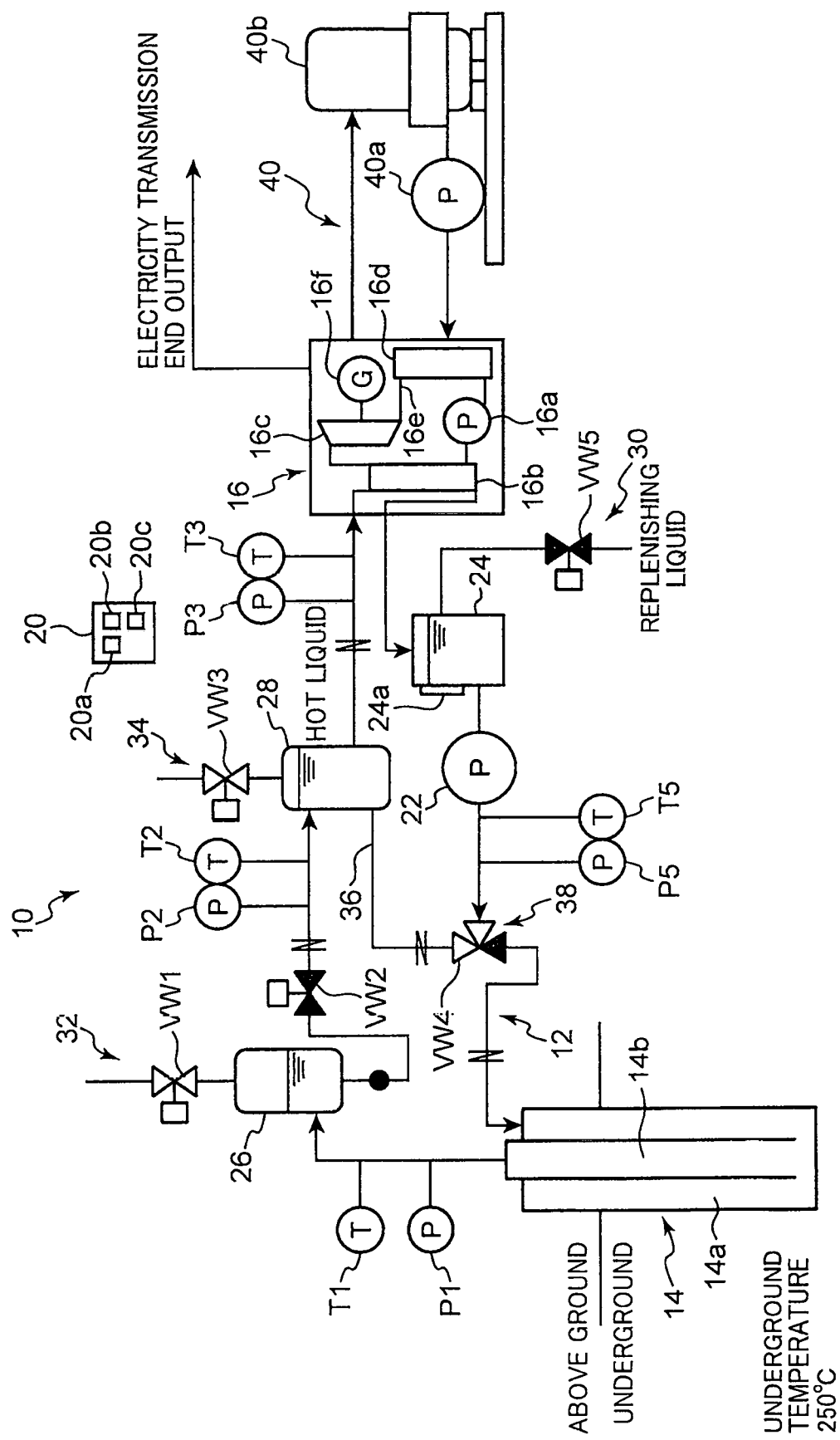
FIG. 9 is a diagram schematically illustrating an overall configuration of a geothermal heat recovery device according to another embodiment of the present invention.

Note that the present invention is not limited to the embodiment, and various changes and modifications may be made without departing from the spirit of the invention. For example, in the embodiment, the on-off valve VW5 is opened and closed according to the detected value of the fourth pressure detector P4 to stabilize the amount of the heat medium in the buffer tank 24; however, this is not restrictive. Since a liquid level height varies in proportion to the amount of the heat medium sealed in the circulation flow path 12, for example, as illustrated in FIG. 9, a liquid level detector 24*a* may be provided in the buffer tank 24. In this case, the fourth temperature detector T4 and the fourth pressure detector P4 may be omitted. When the liquid level detector 24*a* outputs a signal according to the liquid level, the start-up operation control unit 20*a* may be configured to open and close the on-off valve VW5 based on the signal received from the liquid level detector 24*a*.

Figure 10:
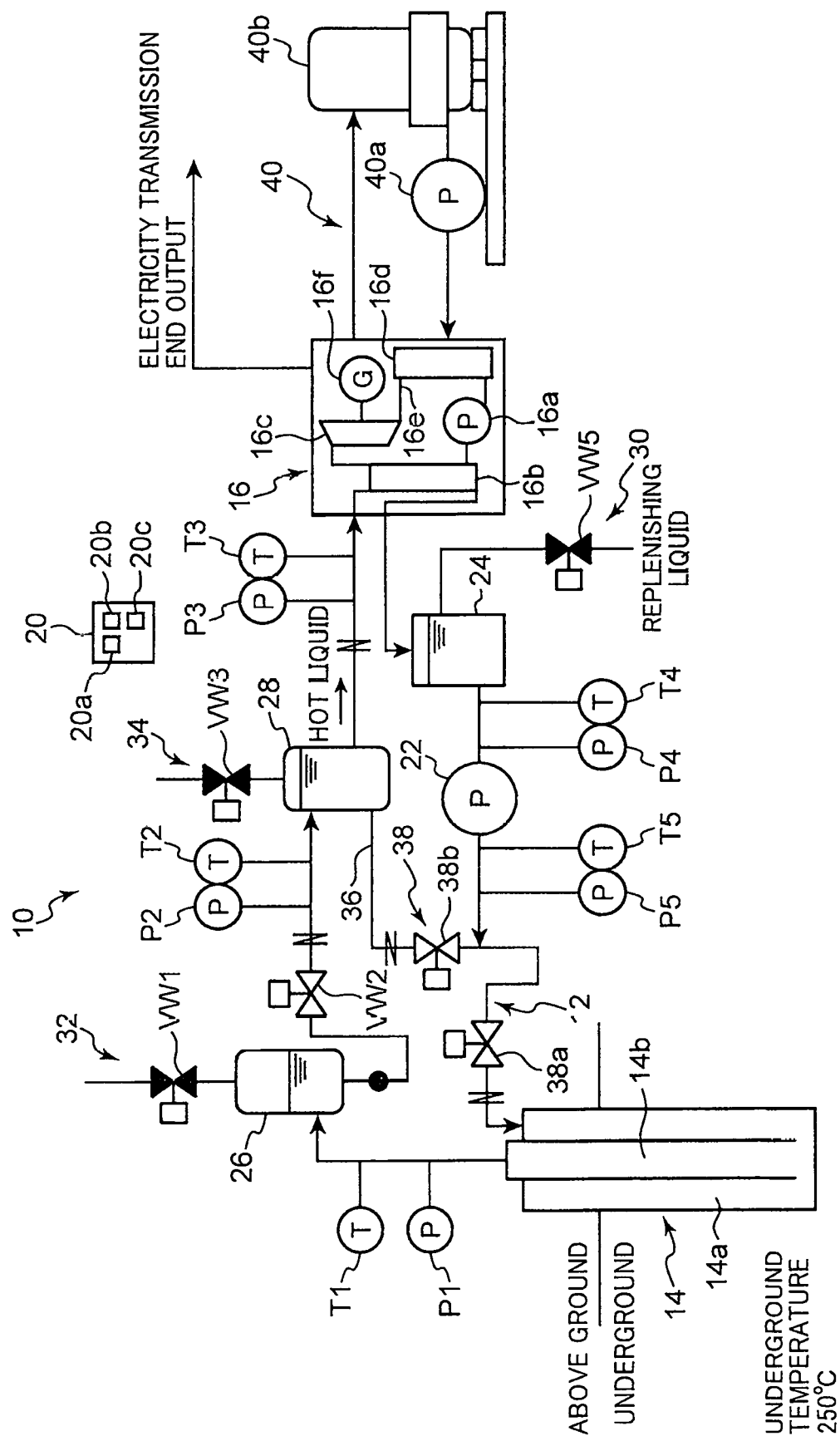
FIG. 10 is a diagram schematically illustrating an overall configuration of a geothermal heat recovery device according to another embodiment of the present invention.

The embodiment has described an example in which the adjustment mechanism 38 for adjusting the flow division ratio of the flow rate of the heat medium flowing into the heat exchanger 14 and the flow rate of the heat medium bypassing the heat exchanger 14 includes the three-way valve VW4; however, the configuration of the adjustment mechanism 38 is not limited to this example. For example, as illustrated in FIG. 10, the adjustment mechanism 38 may include a first flow rate adjustment valve 38*a* and a second flow rate adjustment valve 38*b*, the first flow rate adjustment valve 38*a* being disposed between a connecting portion with the bypass path 36 and the heat exchanger 14 in the circulation flow path 12, and the second flow rate adjustment valve 38*b* being disposed in the bypass path 36.

Figure 11:
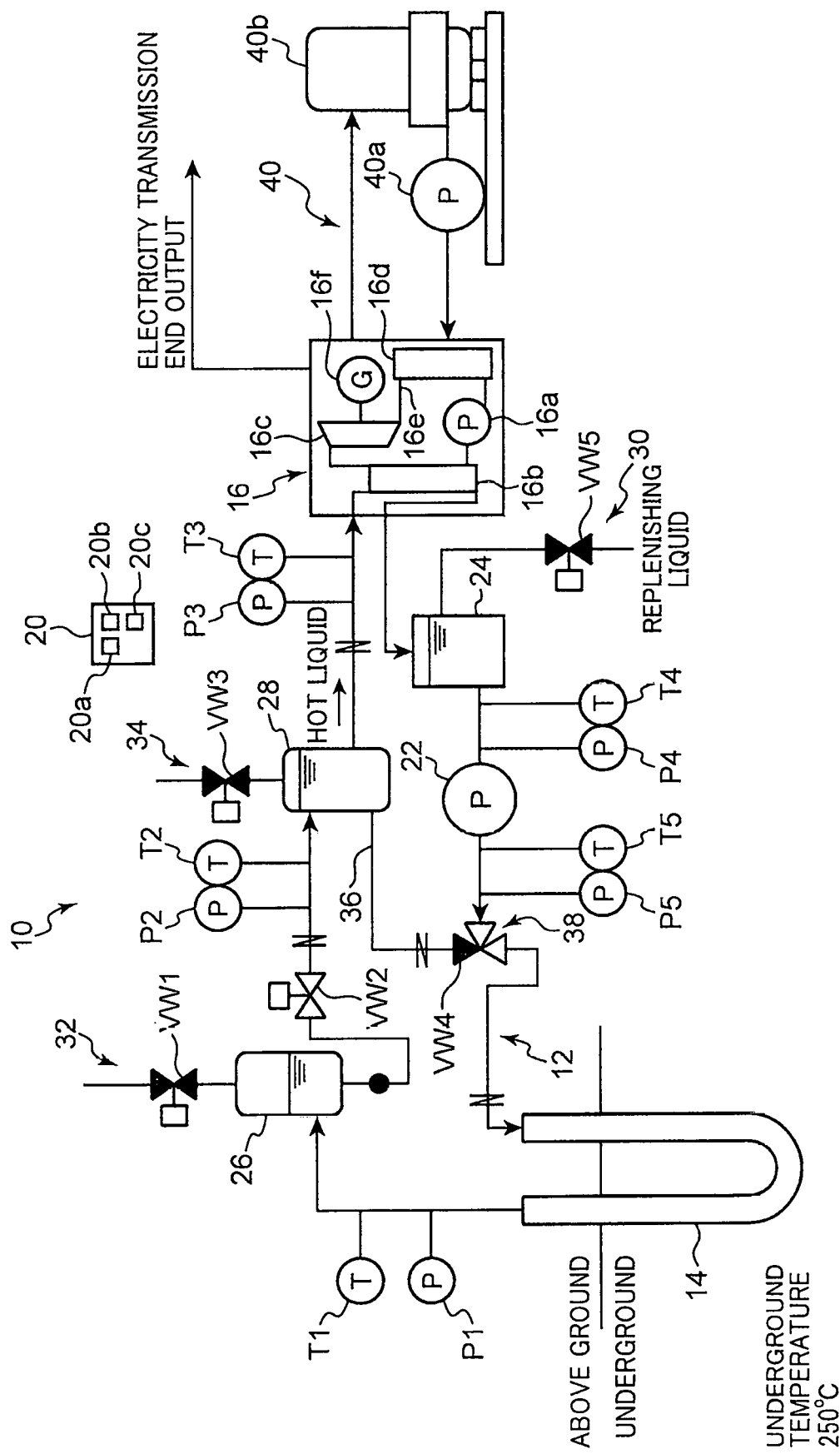
FIG. 11 is a diagram schematically illustrating an overall configuration of a geothermal heat recovery device according to another embodiment of the present invention.

The embodiment has described an example in which the heat exchanger 14 includes the double pipe type heat exchanger 14; however, this is not restrictive. For example, as illustrated in FIG. 11, the heat exchanger 14 may be the heat exchanger 14 including a U-shaped pipe.

Figure 12:
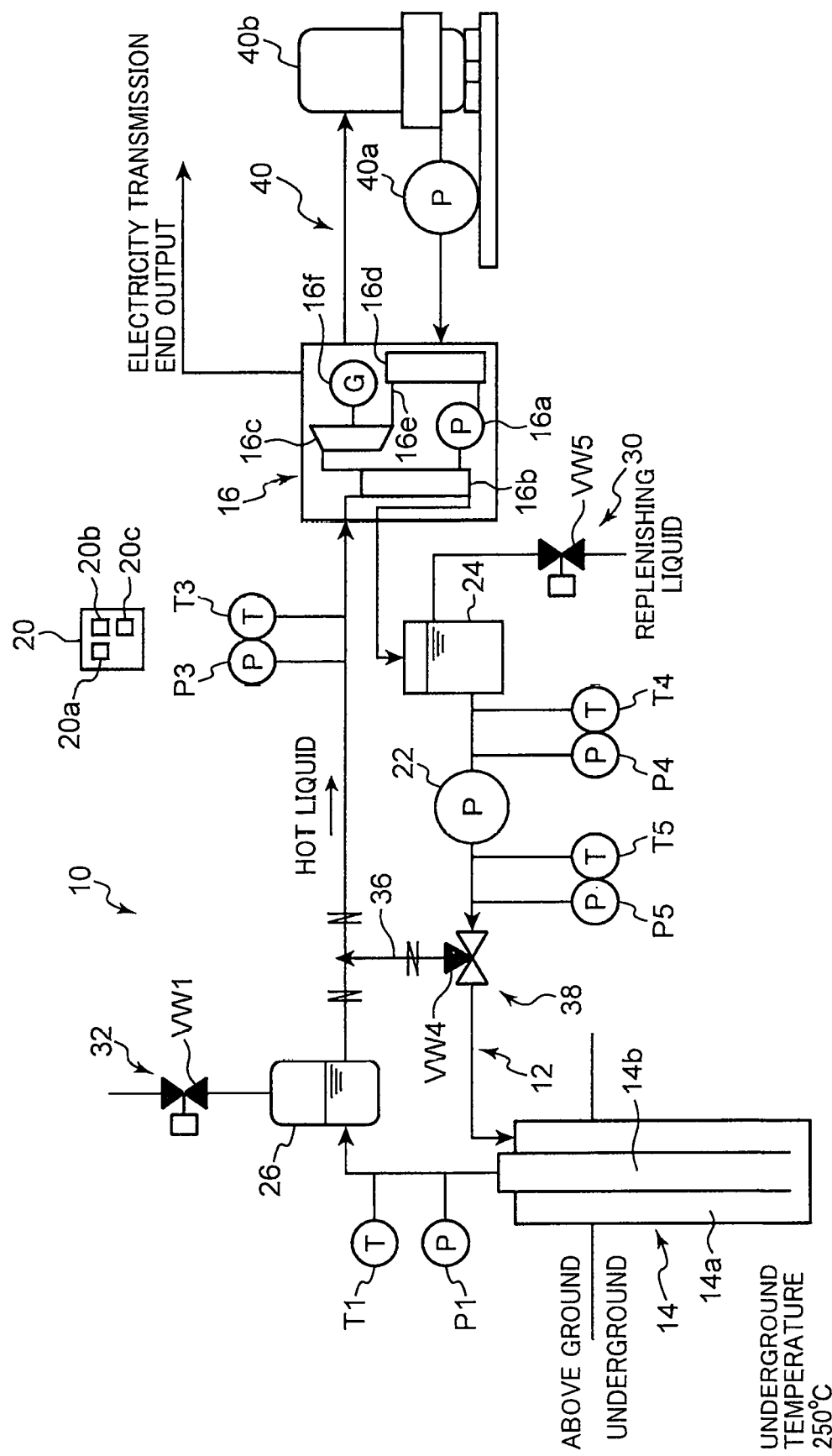
FIG. 12 is a diagram schematically illustrating an overall configuration of a geothermal heat recovery device according to another embodiment of the present invention.

In the embodiment, the mixing tank 28 is provided; however, this is not restrictive. For example, as illustrated in FIG. 12, the mixing tank 28 may be omitted, and one end (outflow end) of the bypass path 36 may be directly connected to a portion between the flash tank 26 and the binary electricity generation device 16 in the circulation flow path 12.

Here, the embodiment will be outlined.

(1) The embodiment is a geothermal heat recovery device including: a circulation flow path provided with a circulation pump, a heat medium pressurized by the circulation pump circulating through the circulation flow path in a hot liquid state; a heat exchanger installed underground and configured to heat the heat medium flowing through the circulation flow path with underground heat; and a binary electricity generation device configured to recover, as electrical energy, thermal energy from the heat medium heated by the heat exchanger.

In the embodiment, the heat medium heated by the heat exchanger flows through the circulation flow path in a hot liquid state, and the thermal energy of the heat medium is recovered as electrical energy by the binary electricity generation device. Therefore, it is possible to make the amount of heat input from the heat medium larger than in a case of driving the turbine with the gaseous heat medium to recover electrical energy, and to increase the amount of electricity generation. In addition, since the heat medium is prevented from boiling, heat of the heat medium can be efficiently transferred to the binary electricity generation device. In addition, since the heat medium is prevented from boiling and is maintained in a hot liquid state, not only it is possible to ensure sufficient electricity generation but also it is unnecessary to take measures to cope with a rise of pressure inside the pipe in the heat exchanger or the like.

(2) A bypass path bypassing the heat exchanger may be connected to the circulation flow path. In this case, the geothermal heat recovery device may further include an adjustment mechanism configured to adjust a flow division ratio between a flow rate of the heat medium flowing into the heat exchanger and a flow rate of the heat medium bypassing the heat exchanger through the bypass path.

In this aspect, in a case where the heat medium is rapidly heated in the heat exchanger, such as when the heat medium starts to flow into the heat exchanger at the start-up operation or the like, the flow rate of the heat medium flowing into the heat exchanger can be reduced. This makes it possible to prevent a large amount of steam from being generated in the heat exchanger. In addition, the temperature of the heat medium flowing toward the binary electricity generation device can be adjusted by adjusting the flow division ratio of the heat medium by the adjustment mechanism.

(3) The geothermal heat recovery device may further include a flash tank disposed between an outflow end of the bypass path and the heat exchanger in the circulation flow path, the flash tank being configured to flash the heat medium heated by the heat exchanger.

In this aspect, even if part of the heat medium in the heat exchanger is vaporized to be in a gas-liquid two-phase state, this can be separated into a liquid heat medium and a gaseous heat medium in the flash tank. This makes it possible to prevent the gaseous heat medium from being introduced into the binary electricity generation device. For example, at the beginning of the start-up operation or the like, when a small amount of heat medium is introduced into the heat exchanger, the vaporized heat medium flows out of the heat exchanger. In this case, at least part of the heat medium can be liquefied by flashing the vaporized heat medium in the flash tank.

(4) The geothermal heat recovery device may further include: a discharge mechanism configured to discharge the gaseous heat medium separated in the flash tank; and a replenisher configured to replenish the circulation flow path with heat medium.

In this aspect, it is possible to prevent the amount of the heat medium from gradually decreasing by replenishing the reduced amount of heat medium while exhausting the gaseous heat medium. Moreover, it is unnecessary to provide means for liquefying the gaseous heat medium.

(5) The geothermal heat recovery device may further include a mixing tank configured to mix the heat medium passing through the heat exchanger and the heat medium bypassing the heat exchanger.

In this aspect, the heat medium heated in the heat exchanger and the heat medium bypassing the heat exchanger are mixed in the mixing tank. Therefore, the temperature of the heat medium in the mixing tank can be adjusted by adjusting the flow division ratio of the heat medium by the adjustment mechanism, and as a result, the temperature of the heat medium flowing toward the binary electricity generation device can be adjusted.

(6) The geothermal heat recovery device may further include a start-up operation control unit configured to perform a start-up operation to gradually increase a flow rate of the heat medium flowing into the heat exchanger while monitoring pressure and temperature on an exit side of the heat exchanger.

In this aspect, at the time of starting to activate the geothermal heat recovery device, since the flow rate of the heat medium flowing into the heat exchanger is gradually increased, it is possible to prevent generation of a large amount of steam in the heat exchanger. In addition, since it is possible to prevent occurrence of a rapid temperature change and pressure change by monitoring the pressure and temperature on the exit side of the heat exchanger, it is possible to prevent the heat exchanger and piping on the exit side thereof from being damaged.

(7) The geothermal heat recovery device may further include an opening and closing mechanism disposed on an exit side of the flash tank in the circulation flow path; and a stop control unit configured to perform control to open the discharge mechanism and to close the opening and closing mechanism when the circulation pump is stopped.

When the circulation pump is stopped, a rapid decrease in the flow rate of the heat medium flowing through the circulation flow path may cause the heat medium to be rapidly gasified in the heat exchanger. In the embodiment, by opening the discharge mechanism when the circulation pump is stopped, it is possible to discharge the gasified heat medium externally. This makes it possible to prevent the heat exchanger and piping on the exit side thereof from being damaged. Since the heat medium is prevented from flowing from the flash tank to the binary electricity generation device, it is possible to prevent the gaseous heat medium from being introduced into the binary electricity generation device.

(8) The embodiment is a method for operating a geothermal heat recovery device including a heat exchanger installed underground and configured to heat a heat medium flowing through a circulation flow path with underground heat, the method including performing a start-up operation to gradually increase a flow rate of the heat medium flowing into the heat exchanger while monitoring pressure and temperature on an exit side of the heat exchanger.

(9) In the method for operating a geothermal heat recovery device, when a circulation pump provided in the circulation flow path is stopped, a discharge mechanism configured to discharge a gaseous heat medium separated by a flash tank may be opened, and an opening and closing mechanism disposed between the flash tank and a binary electricity generation device may be closed.

As described above, the embodiment can increase the amount of electricity generation in an electricity generation system utilizing geothermal heat energy.

The invention claimed is:

1. A geothermal heat recovery device comprising:
    a circulation flow path provided with a circulation pump, a heat medium pressurized by the circulation pump circulating through the circulation flow path in a hot liquid state;
    a heat exchanger installed underground and configured to heat the heat medium flowing through the circulation flow path with underground heat;
    a binary electricity generation device configured to recover, as electrical energy, thermal energy from the heat medium heated by the heat exchanger;
    a bypass path connected to the circulation flow path and bypassing the heat exchanger;
    an adjustment mechanism configured to adjust a flow division ratio between a flow rate of the heat medium flowing into the heat exchanger and a flow rate of the heat medium bypassing the heat exchanger through the bypass path;
    a flash tank disposed between an outflow end of the bypass path and the heat exchanger in the circulation flow path, the flash tank being configured to flash the heat medium heated by the heat exchanger;
    a discharge mechanism configured to discharge the gaseous heat medium separated in the flash tank; and
    a replenisher configured to replenish the circulation flow path with heat medium;
    an opening and closing mechanism disposed on an exit side of the flash tank in the circulation flow path; and
    a stop control unit configured to perform control to open the discharge mechanism and to close the opening and closing mechanism when the circulation pump is stopped.

2. The geothermal heat recovery device according to claim 1, further comprising a start-up operation control unit configured to perform a start-up operation to gradually increase a flow rate of the heat medium flowing into the heat exchanger while monitoring pressure and temperature on an exit side of the heat exchanger.

3. A geothermal heat recovery device comprising:
    a circulation flow path provided with a circulation pump, a heat medium pressurized by the circulation pump circulating through the circulation flow path in a hot liquid state;
    a heat exchanger installed underground and configured to heat the heat medium flowing through the circulation flow path with underground heat;
    a binary electricity generation device configured to recover, as electrical energy, thermal energy from the heat medium heated by the heat exchanger;
    a bypass path connected to the circulation flow path and bypassing the heat exchanger;
    an adjustment mechanism configured to adjust a flow division ratio between a flow rate of the heat medium flowing into the heat exchanger and a flow rate of the heat medium bypassing the heat exchanger through the bypass path; and
    a mixing tank configured to mix the heat medium passing through the heat exchanger and the heat medium bypassing the heat exchanger.

4. The geothermal heat recovery device according to claim 3, further comprising a start-up operation control unit configured to perform a start-up operation to gradually increase a flow rate of the heat medium flowing into the heat exchanger while monitoring pressure and temperature on an exit side of the heat exchanger.

5. A method for operating a geothermal heat recovery device including a heat exchanger installed underground and configured to heat a heat medium flowing through a circulation flow path with underground heat, the method comprising:
    performing a start-up operation to gradually increase a flow rate of the heat medium flowing into the heat exchanger while monitoring pressure and temperature on an exit side of the heat exchanger; and
    opening a discharge mechanism configured to discharge a gaseous heat medium separated by a flash tank and closing an opening and closing mechanism disposed between the flash tank and a binary electricity generation device when a circulation pump provided in the circulation flow path is stopped.

* * * * *